United States Patent

Martin et al.

[11] Patent Number: 5,279,186
[45] Date of Patent: Jan. 18, 1994

[54] ASSEMBLY FOR A NORTH-SOUTH AUTOMATIC TRANSAXLE

[75] Inventors: Berthold Martin, Shelby Township, Macomb County; John C. Collins, Novi; Steven A. Mikel, Farmington Hills; John A. Frait, Walled Lake, all of Mich.

[73] Assignee: Chrysler Corporation, Highland Park, Mich.

[21] Appl. No.: 995,394

[22] Filed: Dec. 18, 1992

[51] Int. Cl.⁵ .............................................. F16H 57/02
[52] U.S. Cl. ..................................... 74/606 R; 74/335; 475/246
[58] Field of Search ................. 74/606 R, 607, 335; 475/246, 334, 475/347, 348

[56] References Cited

U.S. PATENT DOCUMENTS

| | | | |
|---|---|---|---|
| 4,095,487 | 6/1978 | Cartwright et al. | 74/695 |
| 4,736,653 | 4/1988 | Hayakawa et al. | 74/606 R X |
| 4,738,152 | 4/1988 | Takimura et al. | 74/606 R |
| 4,745,986 | 5/1988 | Hanenberger | 74/606 R |
| 4,875,391 | 10/1989 | Leising et al. | 74/866 |
| 5,146,748 | 9/1992 | Okada et al. | 74/606 R X |
| 5,156,576 | 10/1992 | Johnson | 475/206 X |
| 5,186,078 | 2/1993 | Kameda et al. | 74/606 R |
| 5,218,886 | 6/1993 | Louis et al. | 74/606 R |

FOREIGN PATENT DOCUMENTS

| | | | |
|---|---|---|---|
| 2639150 | 3/1978 | Fed. Rep. of Germany | 475/246 |
| 61-153061 | 7/1986 | Japan | 74/606 R |

*Primary Examiner*—Vinh T. Luong
*Attorney, Agent, or Firm*—Edward P. Barthel

[57] ABSTRACT

A north-south transaxle includes a case having a first passageway extending longitudinally and a second passageway spaced from the first passageway and being generally parallel to the first passageway and extending longitudinally. The transaxle also includes a transmission assembly disposed in the first passageway and having a first shaft portion extending through the first passageway at one end thereof and a transfer assembly disposed in the second passageway and having a second shaft portion extending through the second passageway at one end thereof. The transaxle includes first and second bearings rotatably supporting the first and second shaft portions in the first and second passageways, and an assembly for retaining the first and second bearings and the first and second shaft portions in the first and second passageways.

14 Claims, 8 Drawing Sheets

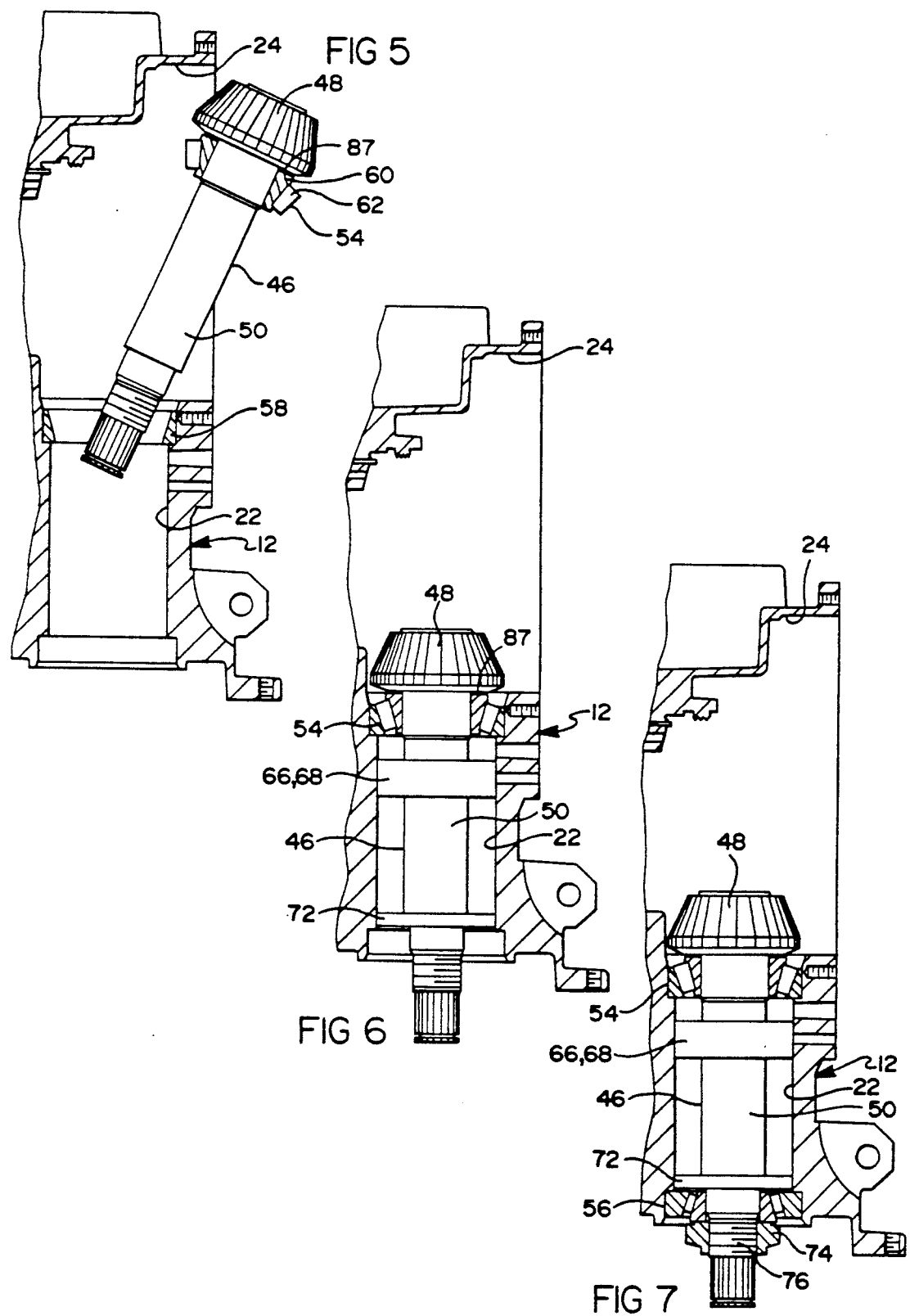

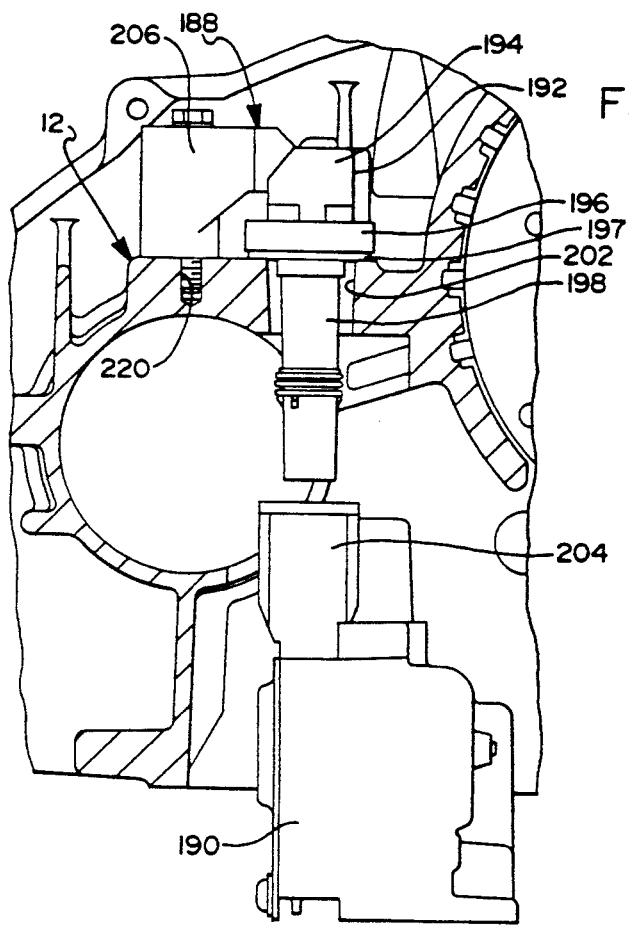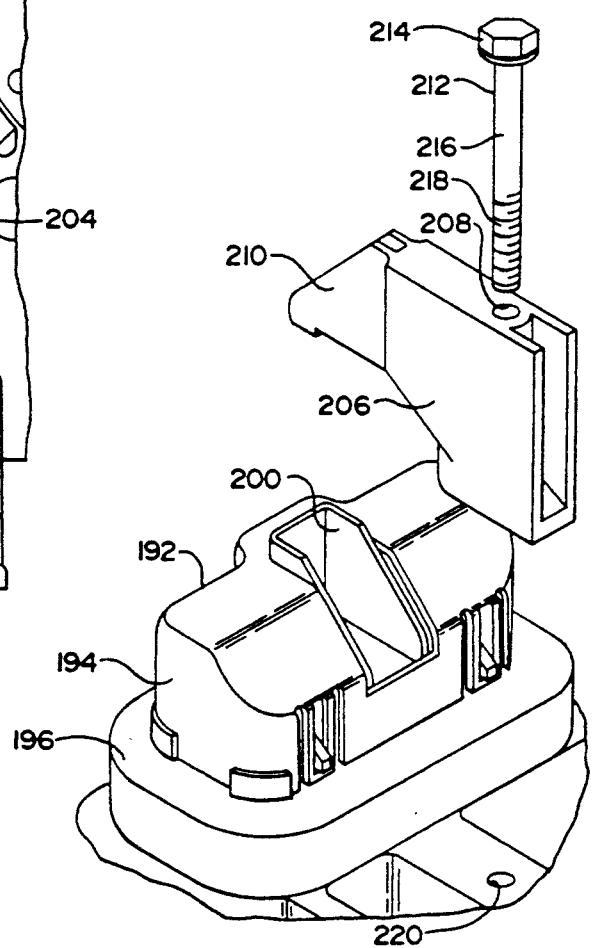

ASSEMBLY FOR A NORTH-SOUTH AUTOMATIC TRANSAXLE

BACKGROUND OF THE INVENTION

1. Field of the Invention

The present invention relates generally to a transaxle primarily intended for motor vehicle use, and more particularly, to a north-south automatic transaxle for a motor vehicle.

2. Description of the Related Art

Generally speaking, motor vehicles require three basic components. These components include a power plant (such as an internal combustion engine), a power train and wheels. The internal combustion engine produces force by the conversion of chemical energy in a liquid fuel into mechanical energy of motion (kinetic energy). The function of the power train is to transmit this force to the wheels to provide movement of the motor vehicle.

The power train's main component is typically referred to as the "transaxle". Engine torque and speed are converted in the transaxle in accordance with the tractive-power demand of the motor vehicle. The transaxle is also capable of controlling the direction of rotation being applied to the wheels, so that the motor vehicle may be driven both forward and backward.

Typically, the transaxle includes two basic components. These components are a transmission and differential. The transmission is generally referred to as a manually actuated or automatic transmission. An automatic transmission is designed to take automatic control of frictional units, gear ratio selection and gear shifting. An example of such an automatic transmission is disclosed in U.S. Pat. No. 4,875,391, issued on Oct. 24, 1989, to Leising, et al. The differential is typically an arrangement of gears forming an epicyclic train for connecting two shafts or axles for the wheels in the same line, dividing the force from the transmission equally between them, and permitting one shaft to revolve faster than the other.

In recent years, transaxles have been orientated in an east-west manner or generally perpendicular to a longitudinal axis of the motor vehicle. While this orientation provides several advantages, it has been desired to orientate the transaxle in a north-south manner or generally parallel to the longitudinal axis of the motor vehicle It has also been desired to provide a north-south orientated transaxle which is more compact and meets specific needs and requirements of today's motor vehicle design.

SUMMARY OF THE INVENTION

It is, therefore, one object of the present invention to provide a transaxle for a motor vehicle having a north-south orientation.

It is another object of the present invention to provide a north-south automatic transaxle for a motor vehicle.

It is yet another object of the present invention to provide a transfer assembly between a transmission and differential of a transaxle and a method of assembling the transfer assembly.

It is still another object of the present invention to provide a retaining arrangement for the transmission and transfer assembly.

It is a further object of the present invention to provide thermal compensation of bearing preload for the differential of the transaxle.

It is yet a further object of the present invention to provide a method of adjusting the engagement between the transfer assembly and differential.

It is a still further object of the present invention to provide a lubrication system for lubricating a bearing of the transfer assembly.

It is another object of the present invention to provide an assembly for retaining a connector to the transaxle.

To achieve the foregoing objects, the present invention is an automatic transaxle for a motor vehicle including a transmission assembly having an orientation generally parallel to a longitudinal axis of the motor vehicle. The transaxle also includes a transfer assembly spaced laterally and generally parallel to the transmission assembly. The transaxle further includes a differential assembly cooperating with the transfer assembly.

The present invention is also an assembly for a north-south transaxle including a case having a first passageway extending longitudinally and a second passageway spaced from the first passageway and being generally parallel to the first passageway and extending longitudinally. The assembly also includes a transmission assembly disposed in the first passageway and having a first shaft portion extending through the first passageway at one end thereof and a transfer assembly disposed in the second passageway and having a second shaft portion extending through the second passageway at one end thereof. The assembly includes first and second bearings rotatably supporting the first and second shaft portions in the first and second passageways, and means for retaining the first and second bearings and the first and second shaft portions in the first and second passageways. The transaxle includes other specific features to be described.

One advantage of the present invention is that an automatic transaxle is provided for a motor vehicle having a north-south orientation generally parallel to a longitudinal axis of the motor vehicle Another advantage of the present invention is that the transaxle has a transfer assembly between a transmission assembly and differential assembly. Yet another advantage of the present invention is that a retaining arrangement is provided which allows sprocket wheels and a transfer chain to be removed and installed without disturbing bearings for the transmission assembly and transfer assembly. Still another advantage of the present invention is that the transaxle case and differential assembly are made of an aluminum material to provide thermal compensation of bearing preload for the differential assembly. A further advantage of the present invention is that a lubrication system is provided in the differential assembly for lubricating a bearing of the transfer assembly. A still further advantage of the present invention is that an assembly is provided to retain the connector to the transaxle case to allow removal and installation of a solenoid assembly without disturbing the connector.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 5 is a partial enlarged view of a portion of FIG. 4 illustrating a transfer shaft being installed.

FIG. 6 is a view similar to FIG. 5 illustrating the transfer shaft installed.

FIG. 7 is a view similar to FIG. 6 illustrating the transfer shaft installed and retained in the transaxle.

FIG. 11 is a fragmentary view of the transaxle of FIGS. 1 and 2.

FIG. 12 is a partial exploded perspective view of a portion of FIG. 11.

DESCRIPTION OF THE PREFERRED EMBODIMENT(S)

Figure 1:
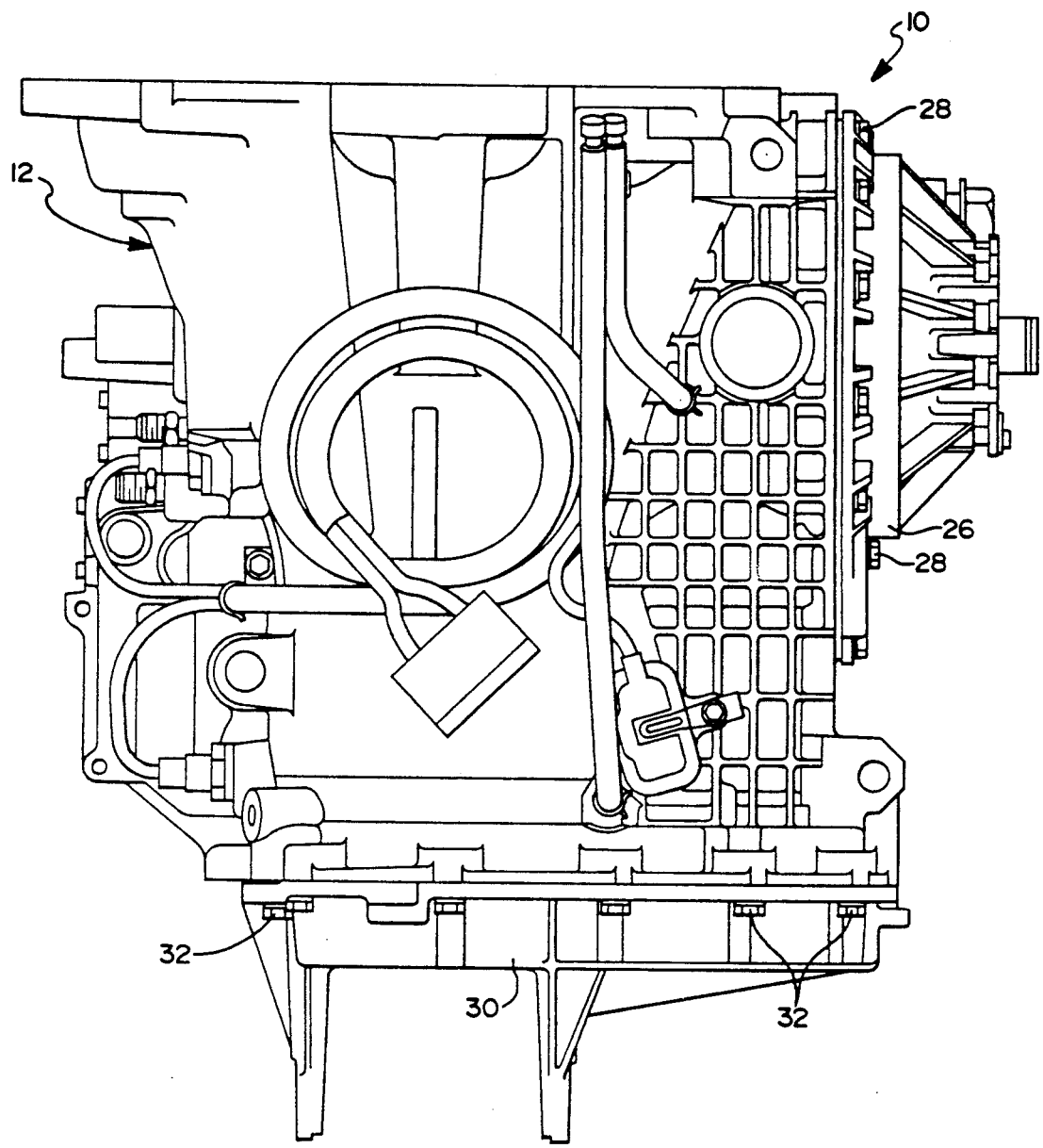
FIG. 1 is a plan view of a north-south automatic transaxle according to the present invention.
Figure 2:
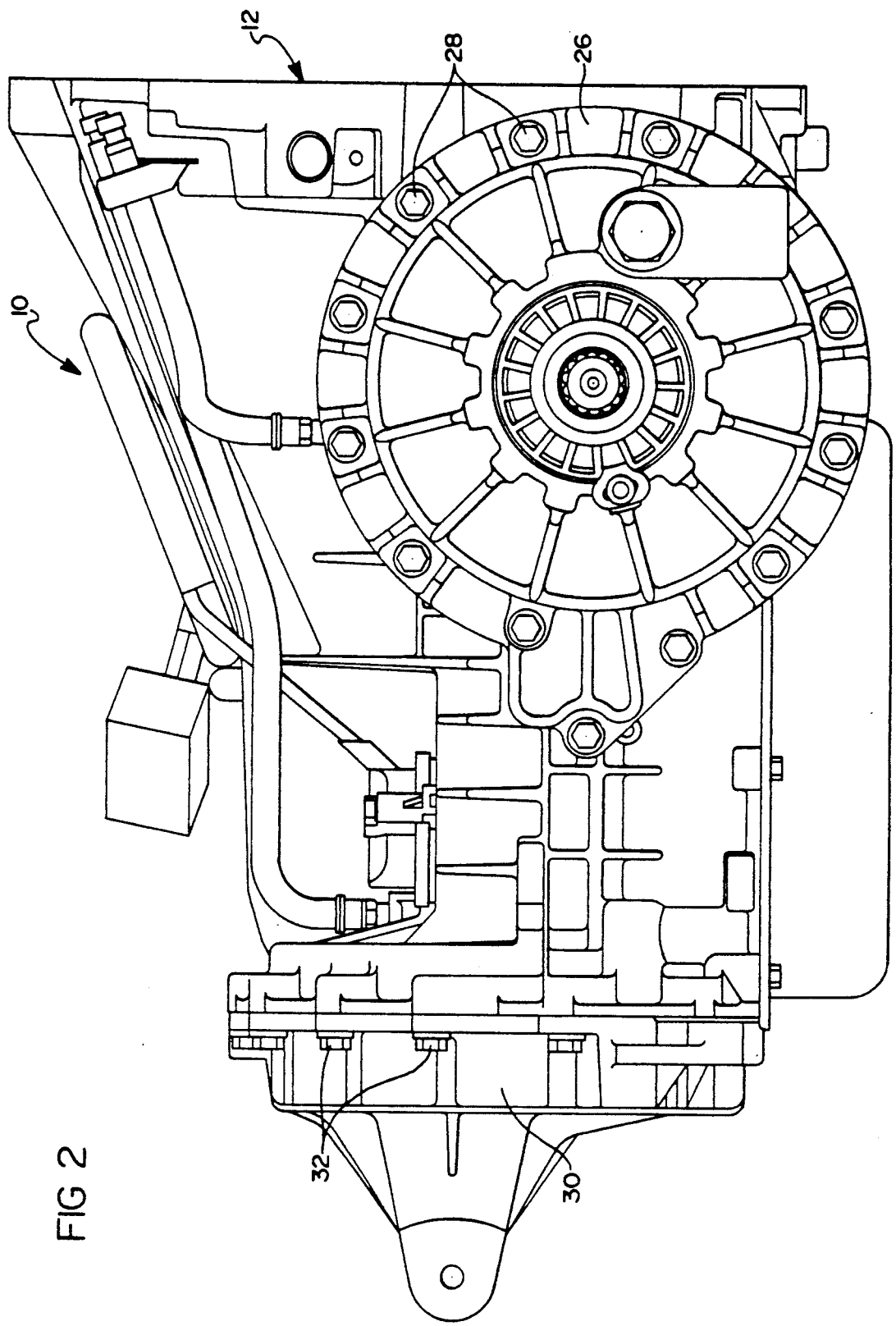
FIG. 2 is an elevational view of the transaxle of FIG. 1.

Referring to FIGS. 1 through 4, a transaxle 10, according to the present invention, is illustrated for a motor vehicle (not shown) such as an automotive vehicle. The transaxle 10 has a north-south or longitudinal powertrain orientation generally parallel to a longitudinal axis of the motor vehicle. The transaxle 10 includes a case 12, transmission assembly 14, transfer assembly 16 and differential assembly 18. The case 12 houses the transmission assembly 14, transfer assembly 16 and differential assembly 18. The transmission assembly 14 converts torque and speed from an engine (not shown) such as an internal combustion engine of the motor vehicle and produces a torque output. The transfer assembly 16 transfers the torque output from the transmission assembly 14 to the differential assembly 18. The differential assembly 18 divides the torque output and transmits the resultant torque to wheels (not shown) of the motor vehicle.

The case 12 has a first passageway 20 extending longitudinally therethrough to house the transmission assembly 14. The case 12 also has a second passageway 22 spaced laterally and substantially parallel to the first passageway 20 and extending longitudinally therethrough to house the transfer assembly 16. The case 12 includes a cavity 24 at one end of the second passageway 22 to house the differential assembly 18. The cavity 24 is closed by a differential cover member 26 connected by suitable fastening means such as bolts 28 to a side of the case 12. The case 12 also includes a rear cover member 30 connected by suitable fastening means such as bolts 32 to a rear or output end of the case 12 to enclose the ends of the transmission assembly 14 and transfer assembly 16. The case 12, differential cover member 26 and rear cover member 30 are from a similar metal material such as an aluminum material.

The transmission assembly 14 is an automatic transmission of the type disclosed in U.S. Pat. No. 4,875,391 to Leising et al. and assigned to the same assignee at the present invention, the disclosure of which is hereby incorporated by reference. As illustrated, the transmission assembly 14 includes a shaft portion 34 of a rear carrier of a gear assembly (not shown) disposed in the first passageway 20. The shaft portion 34 extends longitudinally and is rotatably supported by a bearing 35 such as a tapered roller bearing in the case 12. The transmission assembly 14 includes a nut 36 which threadably engages a threaded portion 37 on the shaft portion 34 to retain the shaft portion 34 and bearing 35 in the case 12. The transmission assembly 14 also includes an output sprocket wheel 38 connected by a spline connection 39 to the shaft portion 34. The output sprocket wheel 38 is retained to the shaft portion 34 by suitable retaining means such as a wave washer 40 and a snap ring 42. The transmission assembly 14 further includes a spacer 44 disposed between the nut 36 and the output sprocket wheel 38 to align the output sprocket wheel 38 with a transfer sprocket wheel 78 to be described.

The transfer assembly 16 includes a transfer shaft 46 disposed in the second passageway 22. The transfer shaft 46 has a head portion 48 and shaft portion 50. The head portion 48 has a generally frustoconical shape with a plurality of teeth 52 spaced circumferentially thereabout to form a pinion gear. The shaft portion 50 extends longitudinally from the head portion 48 and is rotatably supported in the second passageway 22 by front and rear bearings 54 and 56. The bearings 54, 56 are, preferably, tapered roller bearings having a cup 58 engaging the case 12 and a cone 60 with tapered rollers 62 disposed about the shaft portion 50 and engaging the cup 58. The cup 58 and cone 60 have tapered mating surfaces extending inwardly at an angle toward the transfer shaft 46. It should be appreciated that the front and rear bearings 54 and 56 are conventional and allow the transfer shaft 46 to rotate relative to the case 12.

The transfer assembly 16 also includes front and rear seals 66 and 68 disposed in the second passageway 22 and about the shaft portion 50 and engaging the case 12. The front and rear seals 66 and 68 abut each other and are located at a predetermined position along the shaft portion 50 for a function to be described. The transfer assembly 16 includes a fluid baffle 72 disposed in the second passageway 22 and about the shaft portion 50 and engaging the case 12. The fluid baffle 72 is located adjacent the rear bearing 56 to prevent fluid entering the second passageway 22 from the rear bearing 56.

The transfer assembly 16 further includes a nut 74 which threadably engages a threaded portion 76 on the transfer shaft 46 to retain the transfer shaft 46 and bearings 54, 56 in the case 12. The transfer assembly 16 also includes a transfer sprocket wheel 78 connected by a spline connection 79 to the shaft portion 50 of the transfer shaft 46. The transfer sprocket wheel 78 is retained to the transfer shaft 46 by suitable retaining means such as a wave washer 80 and a snap ring 82.

Figure 3:
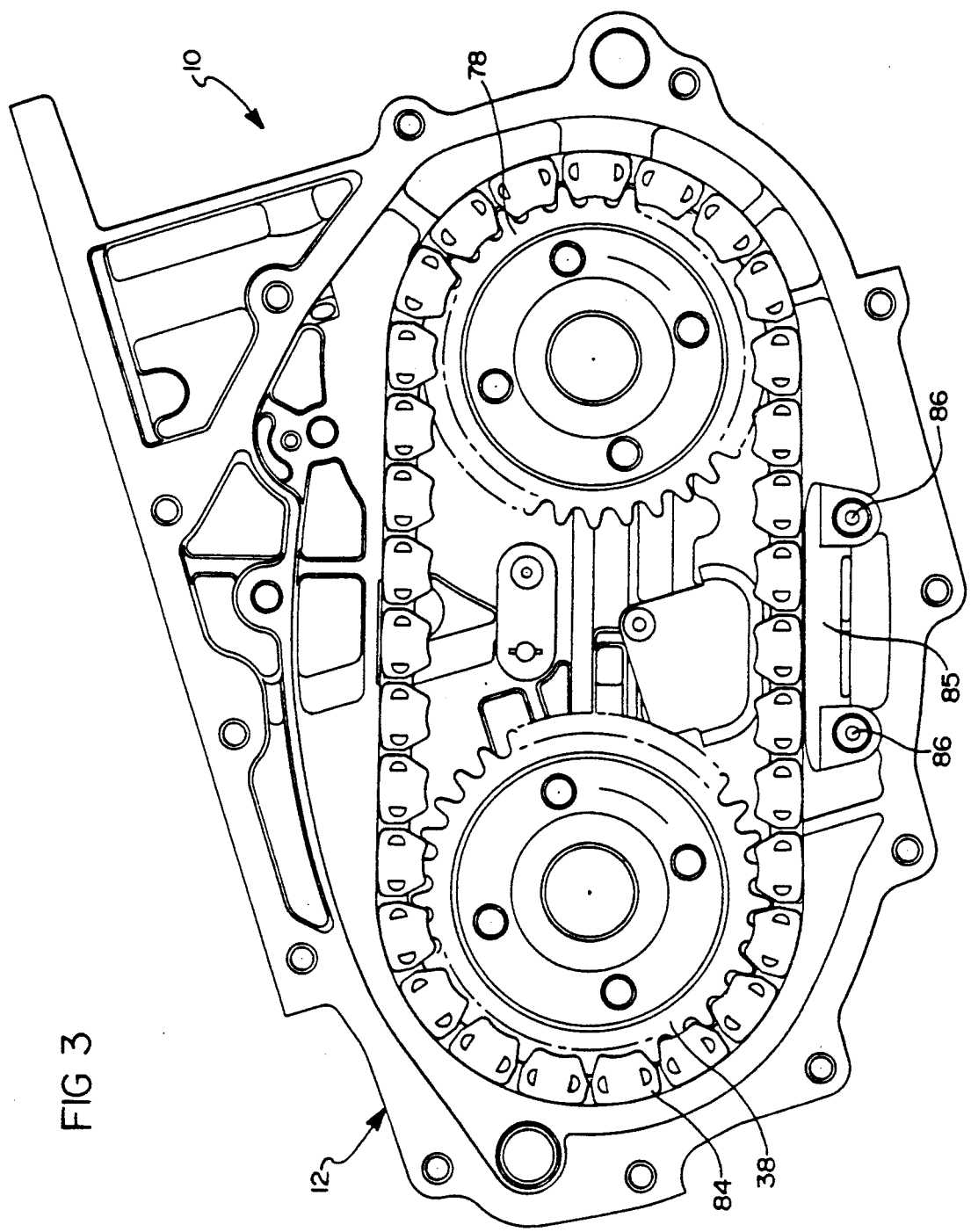
FIG. 3 is an end view of the transaxle of FIGS. 1 and 2 rotated approximately one hundred eighty degrees.
Figure 4:
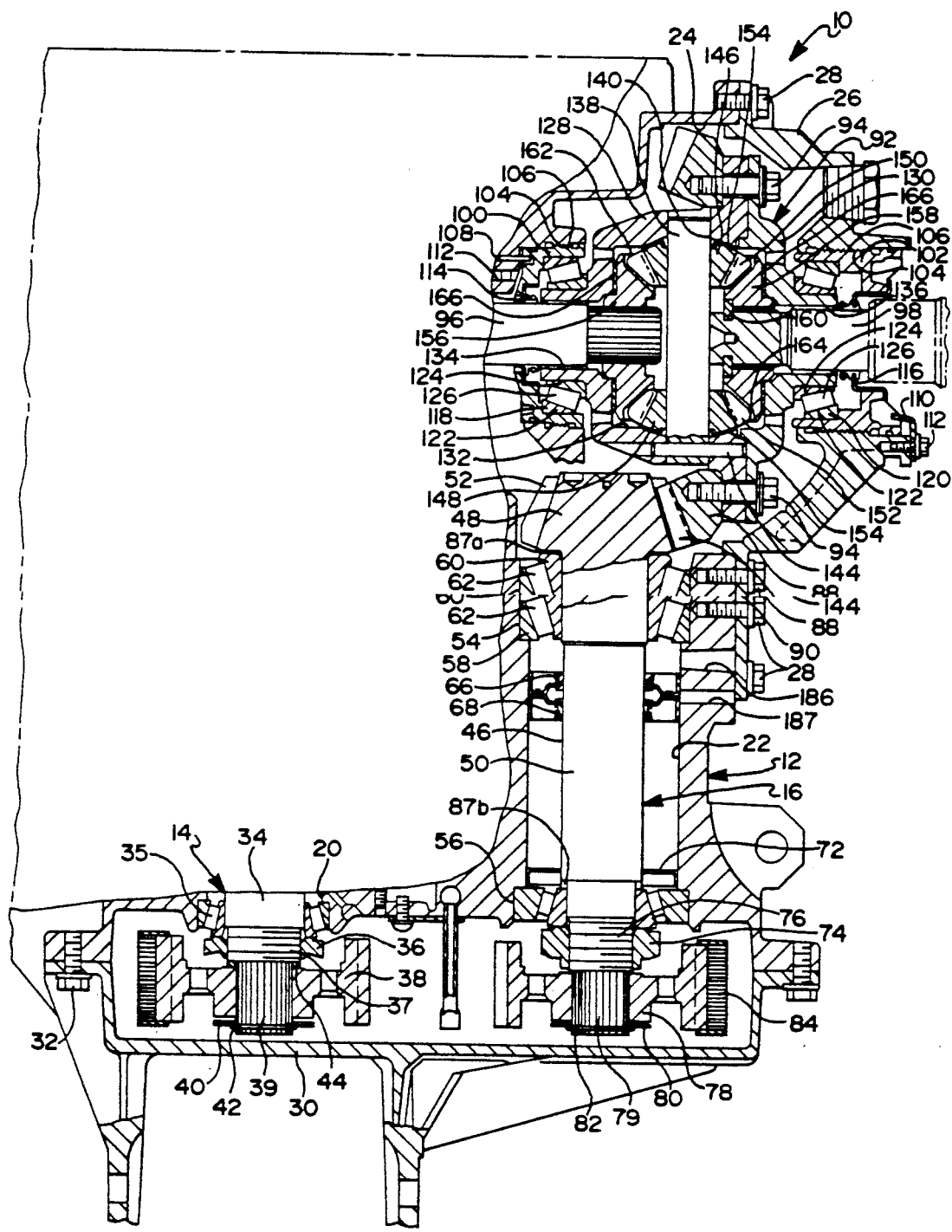
FIG. 4 is a fragmentary view of the transaxle of FIGS. 1 and 2.

Referring to FIGS. 3 and 4, the transaxle 10 also includes a transfer chain 84 disposed about the output sprocket wheel 38 and transfer sprocket wheel 78 to connect the sprocket wheels 38 and 78 together. The transaxle 10 further includes a snubber 85 connected t the case 12 by suitable fastening means such as bolts 86. Preferably the snubber 85 is made of an elastomeric material and is located on the tension or power side of the transfer chain 84. The snubber 85 dampens and resists excursions or vibrations of the transfer chain 84 due to a vertical component of rotation. It should be appreciated that rotation of the shaft portion 34 and output sprocket wheel 38 moves the transfer chain 84, in turn, rotating the transfer sprocket wheel 78 and transfer shaft 46. It should also be appreciated that the transfer chain 84 and sprocket wheels 38, 78 eliminate the need to use transfer gears, thereby making the transaxle 10 quieter and more durable.

Referring to FIGS. 5 through 7, a method of assembling the transfer assembly 16, according to the present invention, is illustrated. The method includes installing the front bearing 54 in the case 12. The cup 58 of the front bearing 54 is pressed or seated along the second passageway 22 in the case 12. Next, the cone 60 of the front bearing 54 is disposed on the cup 58. A tool, such as a dial indicator (not shown), is used to measure the depth of the transfer shaft 46 and determine the thickness of a shim 87a (FIG. 4) that will be required between the head portion 48 and the bearing cone 60. Next, the shim 87 is disposed about the shaft portion 50 and seated against the head portion 48. The cone 60 is removed from the case 12, disposed about the shaft portion 50, and pressed or seated against the head portion 48.

As illustrated in FIG. 5, the method includes installing the transfer shaft 46 with shim 87 and cone 60 in the case 12. The shaft portion 50 is inserted into the cavity 24 and rotated to enter the second passageway 22. The shaft portion 50 is extended through the second passageway 22 until the cone 60 seats against the cup 58 of the front bearing 54. As illustrated in FIG. 6, the method includes installing the front and rear seals 66 and 68 and fluid baffle 72 in the case 12. The front and rear seals 66 and 68 are disposed about the shaft portion 50. A tool, such as a press (not shown), is used to install the front and rear seals 66 and 68 at the proper location along the shaft portion 50. The fluid baffle 72 is disposed about the shaft portion 50 and installed in the case 12 at the proper location along the shaft portion 50.

Next, the method includes installing the rear bearing 56 in the case 12. The cup 58 of the rear bearing 56 is pressed or seated along the second passageway 22 in the case 12. A preload shim 87b is disposed about the shaft portion 50 and seated against a shoulder of the shaft portion 50. The cone 60 is disposed about the shaft portion 50 and pressed onto the shaft portion 50 until seated against the cup 58 and preload shim 87b. As illustrated in FIG. 7, the nut 74 is threaded onto the threaded portion 76 and tightened to obtain a predetermined torque. After the predetermined torque is obtained, the nut 74 is staked to the transfer shaft 46.

Next, the method includes installing the sprocket wheels 38, 78 and transfer chain 84. The transfer chain 84 is disposed about the sprocket wheels 38, 78 and a chain spreader (not shown) is disposed between the sprocket wheels 38, 78 and adjusted to apply pressure to the transfer chain 84 and form an assembly. The sprocket wheels 38, 78 are then slip fitted onto the shaft portions 34, 50, respectively. The chain spreader is adjusted to release the pressure on the transfer chain 84 and is removed. The wave washers 40, 80 and snap rings 42, 82 are disposed about the shaft portions 34, 50, respectively. The chain snubber 85 is then installed with the bolts 86. Finally, the rear cover member 30 is installed with bolts 32. It should be appreciated that the spacer 44 may be replaced with a different thickness to ensure that the sprocket wheels 38, 78 are at the same height prior to installing the sprocket wheels 38, 78 and transfer chain 84.

Figure 8:
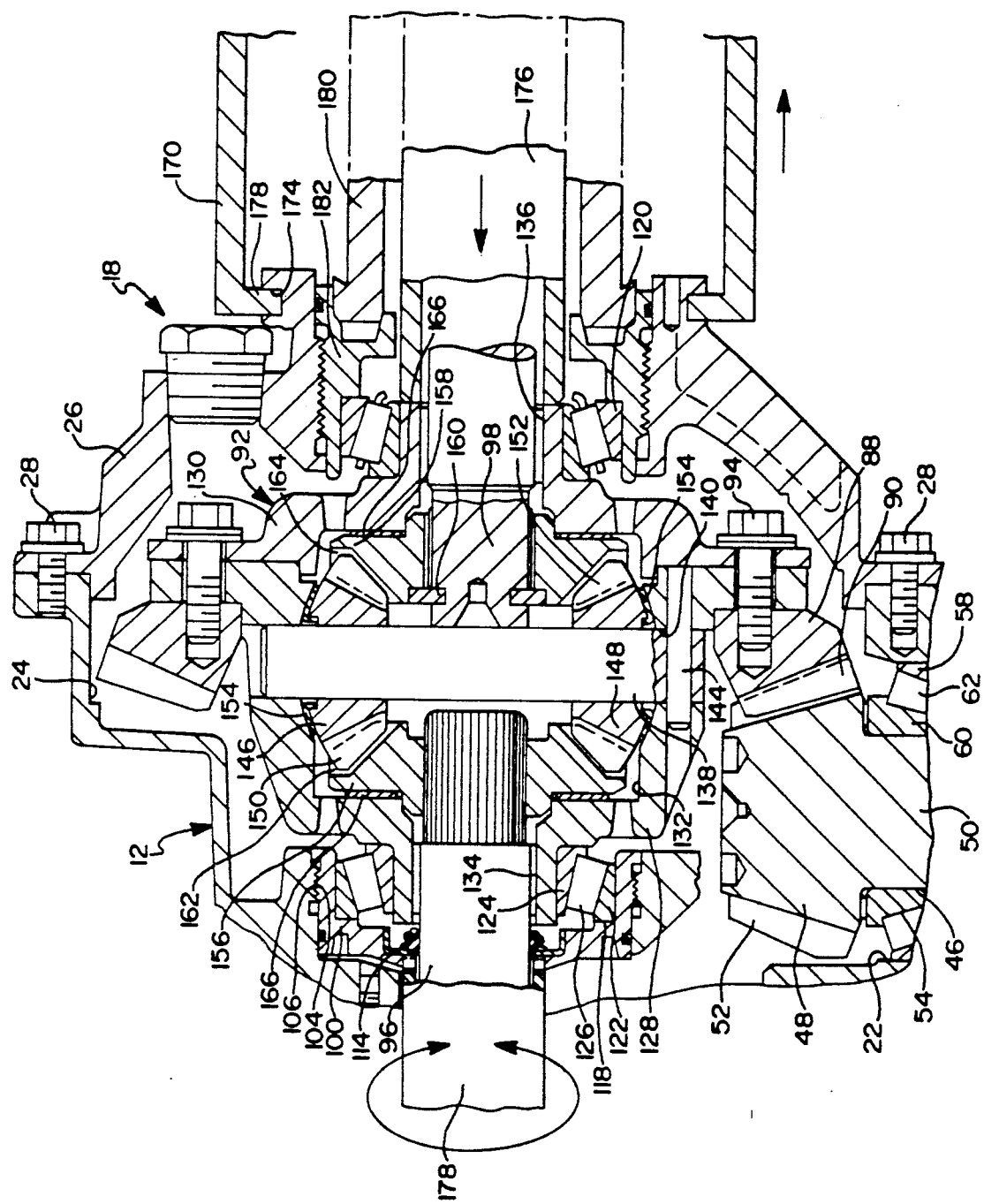
FIG. 8 is an enlarged view of a portion of the transaxle of FIG. 4 illustrated in operational relationship with an adjustment assembly.

Referring to FIGS. 4 and 8, the differential assembly 18 includes a ring or hypoid gear 88 disposed in the cavity 24 and having a plurality of teeth 90 engaging the teeth 52 of the transfer shaft 46. The differential assembly 18 also includes a differential case assembly, generally indicated at 92, disposed in the cavity 24 and connected to the hypoid gear 88 by suitable fastening means such as bolts 94. The differential assembly further includes inner and outer stub or axle shafts 96 and 98 extending into the cavity 24 and differential case assembly 92. The inner stub shaft 96 extends laterally o perpendicularly to the longitudinal axis of the transaxle and is rotatably supported by bearings (not shown) in the case 12. The outer stub shaft 98 is shorter in length than the inner stub shaft 96. The outer stub shaft 98 is aligned with inner stub shaft 96 and extends laterally or perpendicularly to the longitudinal axis of the transaxle 10. It should be appreciated that the stub shafts 96, 98 are operatively connected to the wheels of the motor vehicle.

The differential assembly 18 includes inner and outer differential adjusters 100 and 102 disposed about the inner and outer stub shafts 96 and 98, respectively, and engaging the case 12. The differential adjusters 100, 102 are generally annular and made of a metal material such as an aluminum material similar to the differential cover member 26. The differential adjusters 100, 102 have a threaded portion 104 which threadably engages corresponding threaded portions 106 on the case 12 to allow rotation and lateral adjustment of the differential adjusters 100, 102 relative to the case 12. The differential assembly 18 includes inner and outer adjuster lock brackets 108 and 110 connected to the case 12 by suitable fastening means such as bolts 112 and which engage the differential adjusters 100, 102 to prevent rotation of the differential adjusters 100, 102. The differential assembly 18 further includes inner and outer seals 114, 116 disposed between the differential adjusters 100, 102 and stub shafts 96, 98 to prevent fluid from exiting the differential assembly 18.

The differential assembly 18 also includes inner and outer bearings 118 and 120 disposed between the differential adjusters 100, 102 and differential case assembly 92 to rotatably support the differential case assembly 92 in the cavity 24. The bearings 118, 120 are, preferably, tapered roller bearings having a cup 122 engaging the differential adjusters 100, 102 and a cone 124 with tapered rollers 126 disposed about the differential case assembly 92 and engaging the cup 122. It should be appreciated that the bearings 118, 120 are conventional and allow the differential case assembly 92 to rotate relative to the differential adjusters 100, 102 and case 12.

The differential case assembly 92 includes inner and outer differential carriers 128 and 130 which form a central cavity 132 therein with inner and outer apertures 134 and 136 at each end. The stub shafts 96, 98 extend through the apertures 134, 136 and into the central cavity 132. The differential carriers 128, 130 are made of a metal material such as a cast iron or aluminum material.

The differential case assembly 92 also includes a pinion shaft 138 disposed in a longitudinal aperture 140 extending through the inner differential carrier 128. The pinion shaft 138 is secured to the inner differential carrier 128 by suitable means such as a pin 144. The differential case assembly 92 further includes front and rear pinion gears 146 and 148 disposed in the central cavity 132 and about the pinion shaft 138. The front and rear pinion gears 146 and 148 have a generally frustoconical shape with a plurality of teeth 150 and 152, respectively, spaced circumferentially thereabout. The differential case assembly 92 also includes bearing pads 154 disposed between the pinion gears 146, 148 and the inner differential carrier 128. It should be appreciated that the pinion gears 146, 148 may rotate about the pinion shaft 138.

The differential case assembly 92 also includes inner and outer side gears 156 and 158 disposed in the central cavity 132. The inner and outer side gears 156 and 158 are connected by a spline connection to the inner and outer stub shafts 96 and 98, respectively, and may be retained by suitable retaining means such as a "C" shaped clip 160. The inner and outer side gears 156 and 158 have a generally frustoconical shape with a plurality of teeth 162 and 164, respectively, engaging the teeth 150 and 152 of the front and rear pinion gears 146 and 148. The differential case assembly 92 includes bearing pads 166 disposed between the side gears 156, 158 and carriers 128, 130. It should be appreciated that the hypoid gear 88 drives the differential case assembly 92 for all gears and provides input power to the stub shafts 96, 98. It should also be appreciated that the pinion gears 146, 148 and side gears 156, 158 allow the stub shafts 96, 98 to rotate at different speeds while the motor vehicle is moving.

Referring to FIG. 8, a method for adjusting the engagement or backlash between the transfer assembly 16 and differential assembly 18, according to the present invention, is illustrated. The method includes preloading the bearings 118, 120 and differential cover member 26 of the transaxle 10. The preloading is performed at room temperature and since the case 12, differential cover member 26, adjusters 100, 102 and differential carriers 128, 130 are made of aluminum material, thermal compensation is provided to equalize bearing preload over a temperature operating range. In the method, a preload or dead weight 170 having a hook portion 172 engages corresponding slots 174 in the differential cover member 26. A first ram (not shown) pulls the dead weight 170 in the direction indicated by the arrow and a second ram 176 pushes on the outer differential adjuster 102 to stretch the differential cover member 26. It should be appreciated that distance sensors (not shown) are placed on the differential cover member 26 to record the stretch and an additional sensor (not shown) is placed on the inner stub shaft 96 to measure preload and backlash.

The method includes determining the amount of backlash or engagement between the teeth 52 of the transfer shaft 46 and the teeth 90 of the hypoid gear 88. The amount of stretch of the differential cover member 26 is compared to predetermined plots of stretch versus preload (i.e., dead weight). At a preload less than or greater than a predetermined or target preload, backlash is adjusted by rotating the differential adjusters 100, 102 and moving the differential adjustors 100, 102 laterally in tandem, in turn moving the cups 122, to achieve the target preload. It should be appreciated that the inner and outer adjusters 100 and 102 are rotated to move the hypoid gear 88 closer to or further away from the head portion 48 of the transfer shaft 46 by corresponding tools 178 and 180, respectively, such as a racket with spaced teeth which engage spaced recesses in the differential adjusters 100, 102. It should also be appreciated that the differential adjusters 100, 102 are unlocked before adjustment and locked in place after adjustment by the adjuster lock brackets 108, 110. It should further be appreciated that once the adjusters 100, 102 are locked in place, the dead weight 170, rams 176 and sensors are removed.

Figure 9:
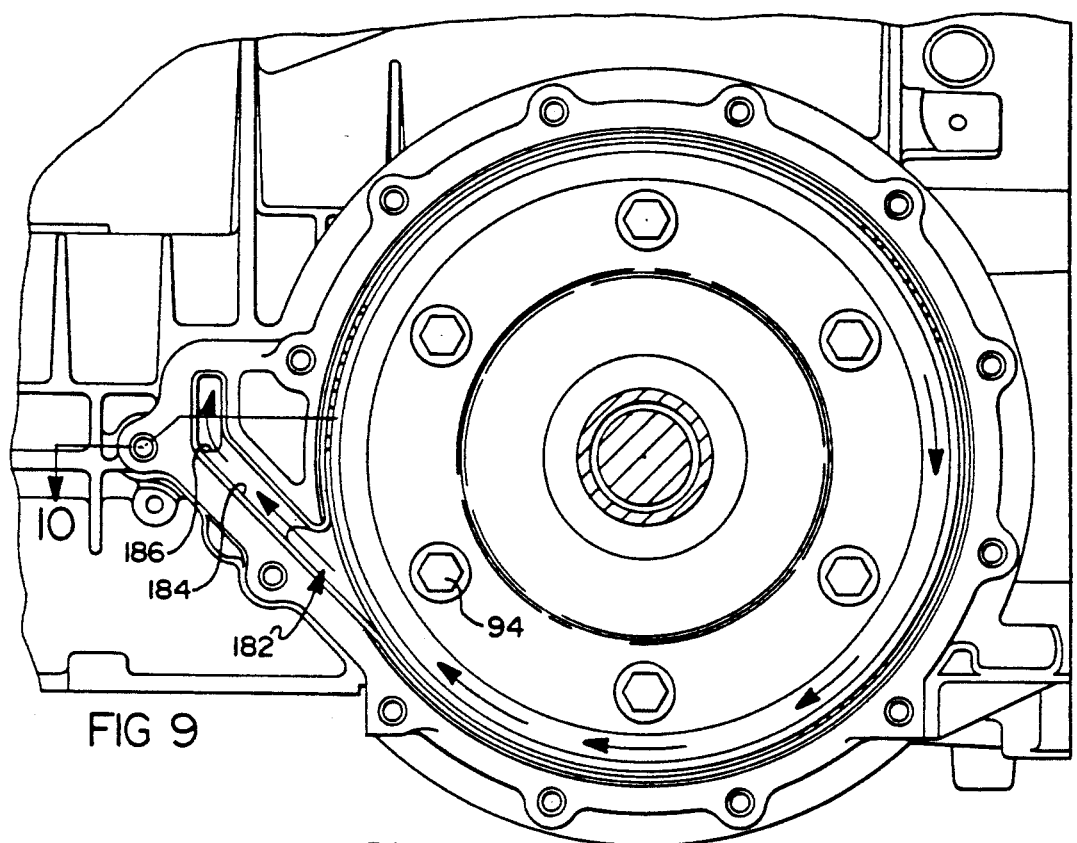
FIG. 9 is an enlarged view of a portion of the transaxle of FIG. 2 with a cover member removed.
Figure 10:
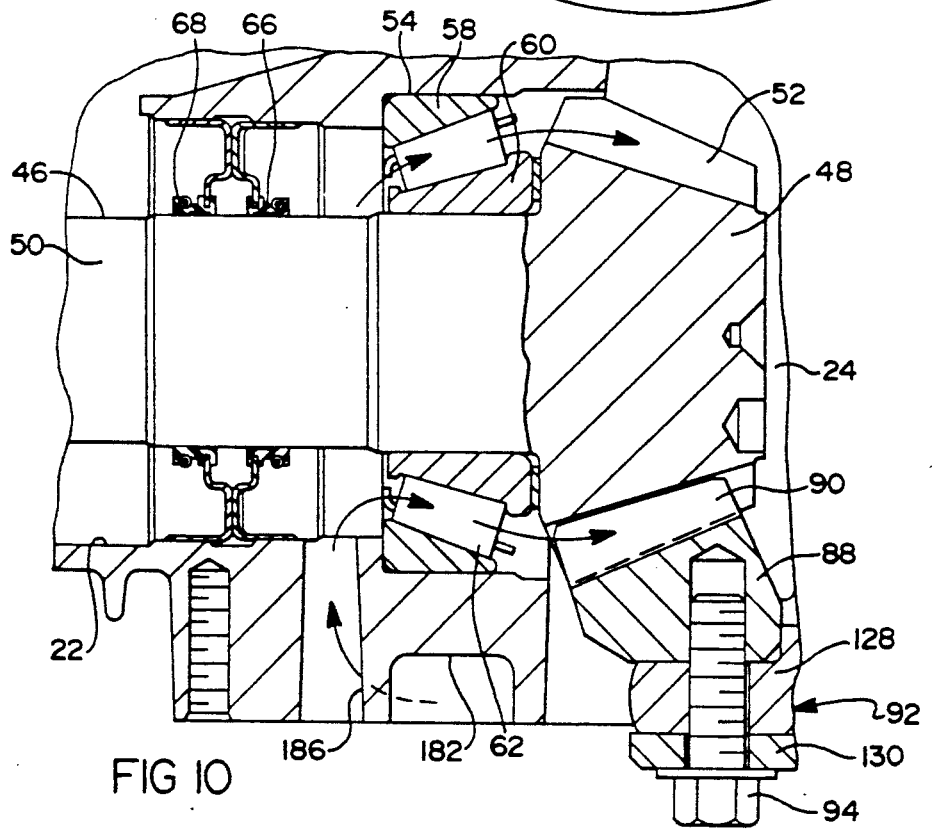
FIG. 10 is a sectional view taken along line 10—10 of FIG. 9.

Referring to FIGS. 9 and 10, the transaxle 10 includes a lubrication system, generally indicated at 182, in the differential assembly 18 for lubricating the front bearing 54 of the transfer assembly 14. The lubrication system 182 includes differential fluid in the cavity 24 which acts as a sump and is separate from the transmission assembly 14. The lubrication system 182 includes a fluid passageway 184 in the case 12 between the cavity 24 and an inlet aperture 186 along the second passageway 22. The front and rear seals 66 and 68 are located past the inlet aperture 186 to separate the differential fluid from transmission fluid of the transaxle 12. It should be appreciated that the seals 66, 68 may have a weep hole 187 between them for fluid identification purposes during leakage.

In operation, the hypoid gear 88 rotates to act as a pump to move differential fluid in the fluid passageway 184 as indicated by the arrows. The differential fluid moves along the fluid passageway 184 and into the inlet aperture 186. From the inlet aperture 186, the differential fluid enters the second passageway 22 and flows between the tapered rollers 162 and through the front bearing 54. Then, the differential fluid travels between the teeth 52 in the transfer shaft 46 and the teeth 90 in the hypoid gear 88 in the cavity 24.

Referring to FIGS. 11 and 12, a connector assembly, generally indicated at 188 and according to the present invention, is illustrated in operational relationship with the case 12 and a solenoid assembly 190. The connector assembly 188 includes a connector 192 connected to a source of electrical power (not shown). The connector 192 has a head portion 194, a flange portion 196, and a body portion 198. The head portion 194 is generally rectangular in shape and has a recess 200 extending inwardly from one side for a function to be described. The flange portion 196 extends laterally from the head portion 194 and has a seal 197 on one side. The body portion 198 is generally rectangular and extends longitudinally from the flange portion 198. The body portion 198 extends through an aperture 202 in the case 12 and the seal 197 on the flange portion 196 engages the case 12 adjacent the aperture 202, as illustrated in FIG. 11. It should be appreciated that the aperture 202 is orientated at an angle relative to a longitudinal axis of the case 12. It should also be appreciated that the flange portion 196 has a width and length greater than the aperture 202. It should further be appreciated that the free end of the connector 192 is disposed in a correspondingly shaped cavity (not shown) of a receiver 204 of the solenoid assembly 190.

The connector assembly 188 also includes a retainer bracket 206 for cooperating with the connector 192. The retainer bracket 206 is generally an inverted "L" shape and has an aperture 208 extending therethrough. The retainer bracket 206 has a projection 210 extending laterally from an upper end of the inverted "L" shape. The projection 210 is generally triangular in shape and engages the recess 200 in the connector 192.

The connector assembly 188 further includes fastener 212 such as bolt to retain the retainer bracket 206 to the case 12. The fastener 212 has a head portion 214 and a shaft portion 216 extending from the head portion 216. The shaft portion 216 has a threaded portion 218 which threadably engages a threaded aperture 220 in the case 12 adjacent the aperture 202.

In operation, the connector 192 is disposed in the aperture 202 such that the body portion 198 extends therethrough and the flange portion 196 abuts the case 12. The projection 210 of the retainer bracket 206 is disposed in the recess 200 of the head portion 194 and the aperture 208 is aligned with the aperture 220 in the case 12. The fastener 212 is disposed in the aperture 208 such that the shaft portion 216 extends therethrough and the threaded portion 218 engages the threaded aperture 220. The fastener 212 is tightened by rotating the head 214 to sandwich the connector 192 between the retainer bracket 206 and case 12.

The solenoid assembly 190 is secured to a valve body (not shown) which is fastened to the case 12. The valve body is moved toward the case 12 such that the body portion 198 is disposed in the receiver 204. The valve body is secured to the case 12 by suitable means such as fasteners (not shown). It should be appreciated that the valve body and solenoid assembly 190 may be removed and installed without disturbing the connector 192 which is retained to the case 12 by the retainer bracket 206 and fastener 212.

Accordingly, the transaxle 10 is an automatic transaxle having a north-south powertrain orientation. The transaxle 10 has a transfer assembly 16 between a transmission assembly 14 and differential assembly 18. A transfer shaft 46 of the transfer assembly 16 is installed through a differential cavity 24 and into a passageway 22. The transmission assembly 14 and transfer assembly 16 have corresponding nuts 36 and 74 for retaining the shafts and bearings which allow sprocket wheels 38, 78 to be installed and serviced without disturbing any bearing setting. The transaxle 10 uses an aluminum material for the case 12, differential cover member 26, differential adjusters 100, 102, and differential carriers 128, 130 to provide thermal compensation to equalize bearing preload over an operating range of the bearings for the differential assembly 18. The transaxle 10 has a unique method for adjusting the backlash between the hypoid gear 88 and transfer shaft 46. The transaxle 10 has a pump and lubrication system for delivery of differential fluid to the front bearing 54 for the transfer shaft 46. Further, the transaxle 10 has a connector assembly 188 for retaining a connector 192 to the case 12 which allows removal and installation of a solenoid assembly 190 without disturbing the connector 192.

The present invention has been described in an illustrative manner. It is to be understood that the terminology which has been used is intended to be in the nature of words of description rather than of imitation.

Many modifications and variations of the present invention are possible in light of the above teachings. Therefore, within the scope of the appended claims, the present invention may be practiced otherwise than as specifically described.

What is claimed is:

1. An assembly for a north-south transaxle comprising:
    a case having a first passageway extending longitudinally and a second passageway spaced from said first passageway and being generally parallel to said first passageway and extending longitudinally;
    a transmission assembly disposed in said first passageway and having a first shaft portion extending through said first passageway at one end thereof;
    a transfer assembly disposed in said second passageway and having a second shaft portion extending through said second passageway at one end thereof;
    first and second bearings rotatably supporting said first and second shaft portions in said first and second passageways, respectively; and
    means for retaining said first and second bearings and said first and second shaft portions i said first and second passageways wherein said retaining means comprises a threaded portion on each of first and second said shaft portions and a nut threadably engaging said threaded portion.

2. An assembly as set forth in claim 1 including means for securing said nut to said shaft portion.

3. An assembly as set forth in claim 2 wherein said securing mean comprises staking said nut to said shaft portion.

4. An assembly as set forth in claim 1 including means for transferring torque between said first and second shaft portions.

5. An assembly as set forth in claim 4 wherein said transferring torque means comprises a first sprocket wheel disposed about said first shaft portion, a second sprocket wheel disposed about said second shaft portion, and a chain disposed about said first and second sprocket wheels.

6. An assembly as set forth in claim 5 including means for retaining said first and second sprocket wheels to said first and second shaft portions, respectively.

7. An assembly as set forth in claim 6 wherein said retaining means comprises a wave washer and snap ring disposed about said each of said first and second shaft portions adjacent said first and second sprocket wheels.

8. An assembly for a north-south transaxle comprising:
    a case having a first passageway extending longitudinally and a second passageway spaced from said first passageway and being generally parallel to said first passageway and extending longitudinally;
    a transmission assembly disposed in said first passageway and having a first shaft portion extending through said first passageway at one end thereof;
    a transfer assembly disposed in said second passageway and having a second shaft portion extending through said second passageway at one end thereof;
    first and second bearings rotatably supporting said first and second shaft portions in said first and second passageways, respectively;
    a threaded portion on each of first and second said shaft portions and a nut threadably engaging said threaded portion for retaining said first and second bearings and said first and second shaft portions in said first and second passageways; and
    means for transferring torque between said first and second shaft portions.

9. An assembly as set forth in claim 8 wherein said transferring torque means comprises a first sprocket wheel disposed about said first shaft portion, a second sprocket wheel disposed about said second shaft portion, and a chain disposed about said first and second sprocket wheels.

10. An assembly as set forth in claim 9 including means for retaining said first and second sprocket wheels to said first and second shaft portions, respectively.

11. An assembly as set forth in claim 10 wherein said retaining means comprises a wave washer and snap ring disposed about said each of said first and second shaft portions adjacent said first and second sprocket wheels.

12. An assembly as set forth in claim 8 including means for securing said nut to said shaft portion.

13. An assembly as set forth in claim 12 wherein said securing means comprises staking said nut to said shaft portion.

14. An assembly for a north-south transaxle comprising:

a case having a first passageway extending longitudinally and a second passageway spaced from said first passageway and being generally parallel to said first passageway and extending longitudinally;

a transmission assembly disposed in said first passageway and having a first shaft portion extending through said first passageway at one end thereof;

a transfer assembly disposed in said second passageway and having a second shaft portion extending through said second passageway at one end thereof;

first and second bearings rotatably supporting said first and second shaft portions in said first and second passageways, respectively;

a threaded portion on each of first and second said shaft portions and a nut threadably engaging said threaded portion and disposed adjacent said first and second bearings for retaining said first and second bearings and said first and second shaft portions in said first and second passageways;

a first sprocket wheel disposed about said first shaft portion, a second sprocket wheel disposed about said second shaft portion, and a chain disposed about said first and second sprocket wheels for transferring torque between said shaft first and second portions; and a wave washer and snap ring disposed about said each of said first and second shaft portions adjacent said first and second sprocket wheels for retaining said first and second sprocket wheels to said first and second shaft portions, respectively.

* * * * *